UNITED STATES PATENT OFFICE.

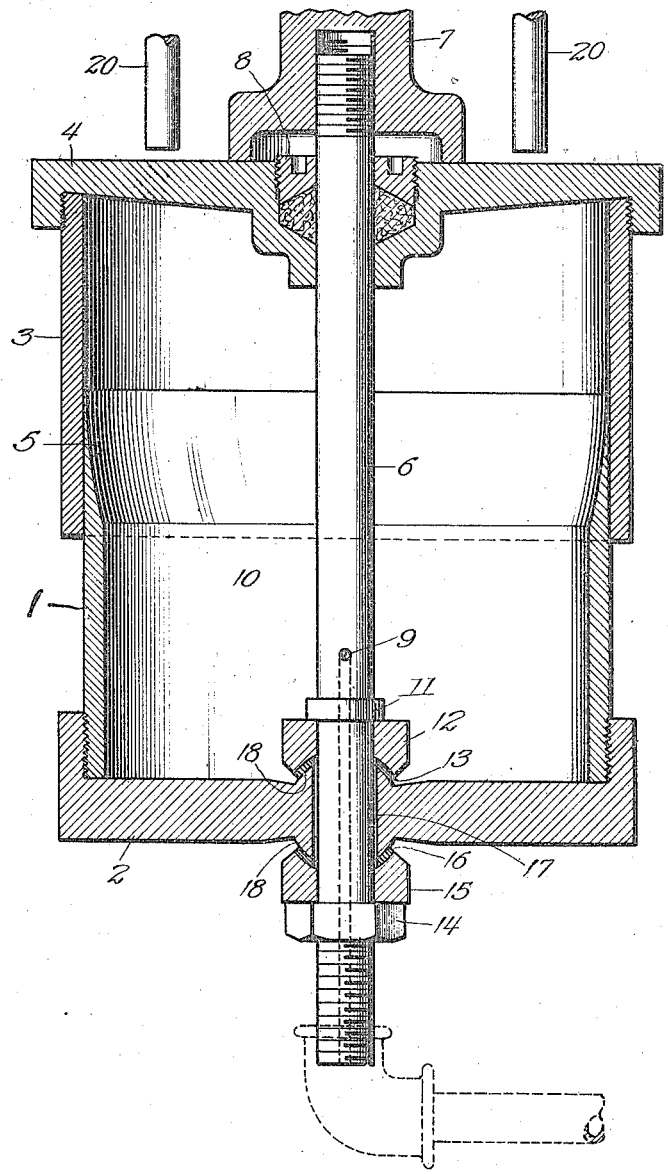

CARL WILLERS AND NILS O. LAURIN, OF CHICAGO, ILLINOIS.

PNEUMATIC DIE-CUSHION.

1,264,731.    Specification of Letters Patent.    Patented Apr. 30, 1918.

Application filed March 19, 1917. Serial No. 155,822.

*To all whom it may concern:*

Be it known that we, CARL WILLERS and NILS O. LAURIN, citizens of the United States of America, and residents of Chicago, county of Cook and State of Illinois, have invented certain new and useful Improvements in Pneumatic Die-Cushions, of which the following is a specification.

Our invention relates to pneumatic die cushions, for use in stamping and drawing presses, and has for its object improvement of such cushions.

Pneumatic cushions of the piston type are in common use at present. The present invention is of the telescopic type and is illustrated by a vertical central section in the accompanying drawing.

The lower telescopic member 1 is screwed into a lower plate or head 2, and the upper telescopic member 3 is similarly screwed into an upper plate or head 4. The outer surface of member 1, and the inner surface of member 3 are ground and fitted so as to make the joint between them as nearly air tight as is practicable in an operating device.

The upper end of member 1, on the part that is continually maintained in member 3, is tapered off as shown at 5 to a thin edge. The amount of this thinning of the metal of member 1 is enough to leave the remaining metal of less strength than will withstand the normal air pressure used in the chamber 10 inclosed by parts 1, 2, 3 and 4. In other words, if the shells 1 and 3 were as thin as the upper portion of the tapered part 5, then they would give away under the mere pressure of the contained air. As so made the part 5 yields under the interior pressure to make an air tight joint after the manner of a leather gasket in an ordinary pump.

Extending axially through the device is a bolt or rod 6 which has its upper end screwed into a part 7 which is a fixture connected to some part of the press, preferably the die shoes. A stuffing box 8 in the head 4 makes an air tight joint around the rod 6.

The lower end of the rod passes through the head 2 and is threaded to provide connections to a source of compressed air. An axial hole is drilled in the lower end of rod 6 and is connected to a transverse hole 9. The channel thus formed serves as a passageway for compressed air from the source to the chamber 10.

On the rod 6 below the opening 9 and above the plate 2 is a collar 11. This may be either a fixed collar or an adjustable nut. Bearing against the lower face of the collar 11 is a washer 12, and between the washer and the plate 2 is a packing 13. These parts, together with nut 14, washer 15 and packing 16 serve to secure the lower head 2 to the rod 6 and to make a tight joint at the point of connection.

For the purpose of facilitating the making of a perfect alinement between the telescopic members 1 and 3, and the rod 6, the hole 17, through which the rod 6 passes, is made slightly larger than the rod, and the bearing surfaces 18 are made spherical. As a consequence, the adjacent surfaces of washers 12 and 15 are concave to match the surfaces 18. As so made, the exact point of connection between rod 6 and head 2 is determined by the movement of head 4 on rod 6.

On the die or drawing rings are pins 20. As the die descends these pins engage head 4 and force it downward on rod 6. At the same time the telescopic member 3 moves downward on member 1. This compresses the air in chamber 10, and the excess pressure is relieved by air flowing backward through hole 9 to the source of supply, which is usually a tank of compressed air. When the pins 20 rise again, the air in chamber 10 forces the head 4 upward until it engages the connection 7.

What we claim is:—

1. In a pneumatic cushion, telescopic members, heads secured to and closing the outer ends of said members, a rod extending through both heads, an air tight connection in one head arranged to permit a longitudinal movement of the head on the rod, and another air tight connection between the rod and the other head, said last mentioned connection being arranged to permit lateral and resist longitudinal movement of head with respect to the rod.

2. In a pneumatic die cushion, telescopic members, heads closing the outer ends of said members, a rod extending through both heads and having an interior passageway by which it serves as an inlet for compressed air, air tight connections between said rod and said heads, one of said connections being arranged to permit longitudinal movement and the other being arranged to permit lateral movement of said heads with respect to said rod, and a stop on said rod serving to limit the outward movement of the longitudinally movable head.

3. In a pneumatic cushion, telescopic members, heads secured to the outer ends of said members, a rod extending through both heads, one head being movable on said rod, a stuffing box in the movable head for the rod, and securing connections between said rod and the stationary head, said connections having curved surfaces substantially as and for the purpose specified.

CARL WILLERS.
NILS O. LAURIN.

Copies of this patent may be obtained for five cents each, by addressing the "Commissioner of Patents, Washington, D. C."